US008861438B2

(12) United States Patent
Sadiq et al.

(10) Patent No.: US 8,861,438 B2
(45) Date of Patent: Oct. 14, 2014

(54) PRESERVING USER-DIFFERENTIATED QUALITY OF SERVICE FOR MOBILE VIRTUAL PRIVATE NETWORK COMMUNICATIONS MADE USING A SHARED CONNECTION POINT

(75) Inventors: Rummana S. Sadiq, S. Barrington, IL (US); James M. Nowakowski, Buffalo Grove, IL (US); Karen M. Upp, Bartlett, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 119 days.

(21) Appl. No.: 13/296,971

(22) Filed: Nov. 15, 2011

(65) Prior Publication Data
US 2013/0121262 A1 May 16, 2013

(51) Int. Cl.
*H04W 4/00* (2009.01)
*H04W 76/02* (2009.01)
*H04M 15/00* (2006.01)
*H04W 28/24* (2009.01)

(52) U.S. Cl.
CPC .......... *H04W 76/022* (2013.01); *H04W 76/021* (2013.01); *H04M 15/66* (2013.01); *H04M 15/8016* (2013.01); *H04W 28/24* (2013.01); *H04W 76/025* (2013.01)
USPC ........................................................ 370/328

(58) Field of Classification Search
None
See application file for complete search history.

(56) References Cited

U.S. PATENT DOCUMENTS

| 4,554,522 | A | 11/1985 | Minks |
|---|---|---|---|
| 7,414,970 | B2 | 8/2008 | Towle |
| 7,843,876 | B2 | 11/2010 | Holt et al. |
| 7,957,738 | B2 | 6/2011 | Rey et al. |
| 2003/0012139 | A1 | 1/2003 | Fukumoto et al. |
| 2005/0265335 | A1 | 12/2005 | Ramanath et al. |
| 2009/0300207 | A1 | 12/2009 | Giaretta et al. |
| 2012/0092992 | A1 | 4/2012 | Pappas et al. |
| 2012/0121262 | A1* | 5/2012 | Andriolli et al. ................ 398/49 |
| 2012/0263119 | A1* | 10/2012 | Monogioudis ................ 370/329 |
| 2014/0105017 | A1 | 4/2014 | Scott et al. |

FOREIGN PATENT DOCUMENTS

| EP | 1976196 A1 | 10/2008 |
|---|---|---|
| WO | 2007079773 A1 | 7/2007 |
| WO | 2010112077 A1 | 10/2010 |

OTHER PUBLICATIONS

U.S. Appl. No. 12/906,226, filed Oct. 18, 2010.
3GPP TS 23.203 V9.3.0 (Dec. 2009); 3rd Generation Partnership Project; Technical Specification Group Services and System Aspects; Policy and charging control architecture (Release 9); Dec. 2009.

(Continued)

*Primary Examiner* — Minh-Trang Nguyen
(74) *Attorney, Agent, or Firm* — Steven A. May

(57) ABSTRACT

A set of different communication flows (270-272) can be established between a set of end-user devices (210) and remote devices (265) through an intermediary node (225). For each communication flow (270-272), a flow-specific bearer (250) can be generated between the intermediary node (225) and a corresponding one of the remote devices (265). Each bearer (250) can have quality of service attributes that correspond to flow-specific quality of service attributes of the flow (270-272) to which the flow-specific bearer (250) corresponds. Communication can occur between each of the proximate end-user devices (210) and the remote devices (265) in accordance with the flow-specific quality of service attributes. The intermediate node (225) can direct the exchanged data between unique local communication links and corresponding ones of the flow-specific bearers (250).

19 Claims, 5 Drawing Sheets

(56) References Cited

OTHER PUBLICATIONS

International Search Report and Written Opinion for related International Patent Application No. PCT/US2011/053350 mailed on Dec. 23, 2011.

"Digital Cellular Telecommunications System (Phase 2+); Universal Mobile Telecommunications System (UMTS); LTE; Policy and Charging Control Architecture (3GPP TS 23.203 version 9.6.0 Release 9)," Technical Specification, European Telecommunications Standards Institute, vol. 3GPP SA 2, No. V9.6.0, Oct. 1, 2010.

Ekstrom, H., "QoS control in the 3GPP evolved packet system," IEEE Communications Magazine, vol. 47, No. 2, Feb. 1, 2009, pp. 76-83.

International Search Report for counterpart International Application No. PCT/US2012/062584 mailed on Apr. 3, 2013.

Li Li et al., "End-to End QoS performance management across LTE networks," Network Operations and Management Symposium, 2011, 13th Asia-Pacific, IEEE, Sep. 21, 2011, pp. 1-4.

Notice of Allowance mailed on Jun. 24, 2013 in related U.S. Appl. No. 12/906,226, Scott J. Pappas, filed Oct. 18, 2010.

Notice of Allowance mailed on Mar. 3, 2014 in related U.S. Appl. No. 12/906,226, Scott J. Pappas, filed Oct. 18, 2010.

Non Final Office Action mailed on Jan. 22, 2013 in related U.S. Appl. No. 12/906,226, Scott J. Pappas, filed Oct. 18, 2010.

33GPP TS 23.203 V10.1.0 (Release 10) Sep. 2010; 3rd Generation Partnership Project; Technical Specification Group Services and System Aspects; Policy and charging control architecture, pp. 1-132.

* cited by examiner

PRESERVING USER-DIFFERENTIATED QUALITY OF SERVICE FOR MOBILE VIRTUAL PRIVATE NETWORK COMMUNICATIONS MADE USING A SHARED CONNECTION POINT

FIELD OF THE DISCLOSURE

The present invention relates to wireless communications quality of service (QoS) and, more particularly, to preserving user-differentiated QoS for mobile virtual private network (mVPN) communications made using a shared connection point.

BACKGROUND

Wireless communications are a mainstay of many organizations. Improvements in wireless network technology continue to increase the functionality and ability for those organizations that utilize mobile work environments, such as mobile virtual private networks (mVPNs). However, current wireless communications networks, such as the long-term evolution (LTE) communications network lack the ability to differentiate the QoS between users that connect to the network through shared user equipment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
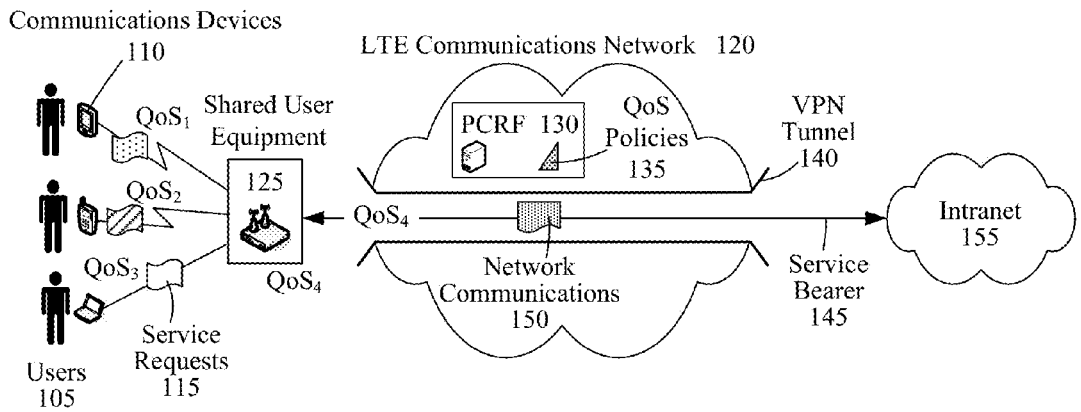
FIG. 1 (Prior Art) illustrates a functional diagram of the current quality of service (QoS) handling for multiple users utilizing a shared user equipment element to connect to an Intranet over a long-term evolution (LTE) communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 (Prior Art) shows a typical long-term evolution (LTE) communications network 120, which lacks an ability to differentiate the QoS between users that connect to the network 120 through shared user equipment 125. In the typical LTE communications network 120, network communications 150 terminate at a node referred to as the user equipment (UE). In many situations, the UE is the user's 105 communications device 110 that interacts with the eNodeB of the LTE communications network 120. However, it is also possible for the UE to be a local, intermediary node to the LTE communications network 120 like the shared user equipment 125 shown in system 100.

The communications devices 110 (e.g., cell phone, smart phone, laptop, etc.) connect to the shared user equipment 125 (wireless or wireline) in order to use the LTE communications network 120 to communicate with an Intranet 155 using a virtual private network (VPN) tunnel 140. Such a configuration is representative of using a LTE communications network 120 to implement a mobile VPN (mVPN).

As the users 105 perform tasks with their communications devices 110, corresponding service requests 115 are generated. Logically, the QoS of each user's 105 service request 115 ($QoS_1$-$QoS_3$) may vary depending upon internal policy. However, the QoS of the individual service request 115 is usurped by the QoS of the shared user equipment 125 ($QoS_4$). This results in the policy charging and rules function (PCRF) 130 of the LTE communications network 120 using QoS policies 135 that are applicable to the shared user equipment 125 to determine the QoS of the service bearer 145 to handle the network communications 150 of the communications devices 110. That is, all the network communications 150 of the communications devices 110 are treated as if they were originated by the shared user equipment 125.

While the displacement of individual QoS levels may be acceptable for general public use, it is unacceptable for time-sensitive, critical network communications 150 like those generated by public safety officers 105. For example, the network communications 150 of public safety officers 105 and civilians 105 connected to the shared user equipment 125 are all assigned to a service bearer 145 commensurate with the QoS of shared user equipment 125 by LTE communications network 120; when, logically, the network communications 150 of the public safety officers 105 are of more importance and should be handled with service bearers 145 of higher QoS.

Briefly, embodiments of the invention address preserving the QoS for a user connected to user equipment, where the user equipment acts as a connection point for multiple users to a wireless communications network like a LTE communications network. A policy services manager (PSM) can be used by the communications network in conjunction with an enhanced PCRF to provide user-differentiated QoS to users utilizing a shared user equipment to connect to the wireless communications network. The enhanced PCRF can generate a unique differentiated services code point (DSCP) for the user's communications device that can be used by the client application of the PSM residing on a communications device specifically to mark subsequent network communications so they can be routed to the service data flow (SDF) having the appropriate QoS.

Figure 2:
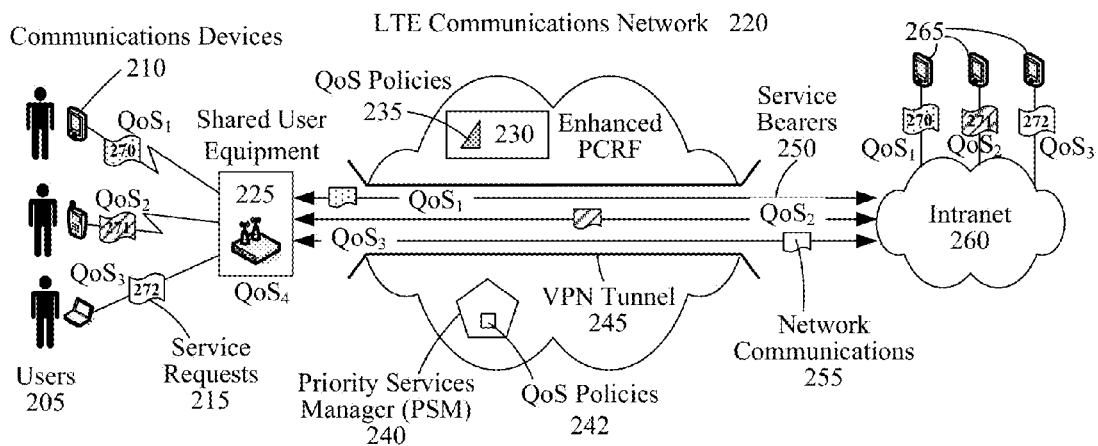
FIG. 2 illustrates a functional diagram of a system for providing user-differentiated quality of service (QoS) as shared user equipment of a LTE communications network is used to connect to an Intranet in accordance with embodiments of the inventive arrangements disclosed herein.

FIG. 2 illustrates a functional diagram of a system 200 for preserving the quality of service (QoS) for users 205 that utilize a shared user equipment 225 of a LTE communications network 220 to connect to an Intranet 260 in accordance with embodiments of the inventive arrangements disclosed herein. In system 200, users 205 can use individual communications devices 210 to connect to the shared user equipment 225.

It should be noted that the LTE communications network 220 represented and/or referred to in the Figures can be considered as illustrative of elements with a conforming 3GPP access network, and those skilled in the art will recognize and appreciate that the specifics of this example are merely illustrative of some embodiments and that the teachings set forth herein are applicable in a variety of alternate settings. For example, since the teaching described do not depend on the elements belonging to a LTE communications network 220, they can be applied to any type of conforming 3GPP access network. As such, other alternative implementations of using different types of conforming 3GPP access network elements can be contemplated and considered to be within the scope of the various teaching described herein.

Further, the conforming 3GPP access network can comprise additional components (e.g., gateways, access points, etc.) not shown in the Figures that support the functionality of the access network without departing from the spirit of the present invention. Additionally, the LTE communications network 220 can include multiple, interlinked LTE communications networks 220, possibly representing different communications providers, despite there being only one LTE communications network 220 shown in the Figures.

As the users 205 perform tasks with their communications devices 210, service requests 215 can be generated. Each service request 215 can have a different QoS requirement ($QoS_1$-$QoS_3$), which can be the same or different than the default QoS level ($QoS_4$) of the shared user equipment 225. The QoS level can be specific to a communication flow 270-272, which represents the end-to-end connection between two linked communication devices 210 and 265. Each of these communication flows 270-272 can have a first segment, which is the linkage between the communication device 210 and the shared user equipment 225, which can be an intermediary node in the communication flow 270-272. Each flow 270-272 can also include a service bearer 250 established between the shared user equipment 225 and the end-device 265. Each bearer 250 can be have QoS attributes, which match the QoS attributes of the flow 270-272 that corresponds to the bearer 250. Multiple flows 270-272 having the same QoS attributes can share a bearer 250; otherwise, each communication flow 270-272 requires its own bearer 250.

Unlike system 100 of FIG. 1, the LTE communications network 220 can utilize an enhanced PCRF 230 and a priority services manager (PSM) 240 to assign each service request 215 and its subsequent network communications 255 to a service bearer 250 of the VPN tunnel 245 having the corresponding QoS. The enhanced PCRF 230 and PSM 240 can represent additional functionality, which is not available in the conventional LTE communications network 120 of system 100.

As shown in system 200, each service request 215 can be handled by a service bearer 250 of the matching QoS. However, it is possible for the PSM 240 and/or enhanced PCRF 230 to dynamically upgrade or downgrade the QoS of particular service request 215 according to user 205 information, communications device 210 information, the type of service being requested, and/or predefined QoS policies 242 and 235.

For example, the PSM 240 can determine that a service request 215 having $QoS_3$ as an initial or default QoS should use a service bearer 250 with $QoS_2$ or $QoS_4$, depending on the circumstances. Hence, the PCM 240 can re-prioritize the QoS that a user 205 receives based upon existing QoS policies 235 and current operating conditions.

Figure 3:
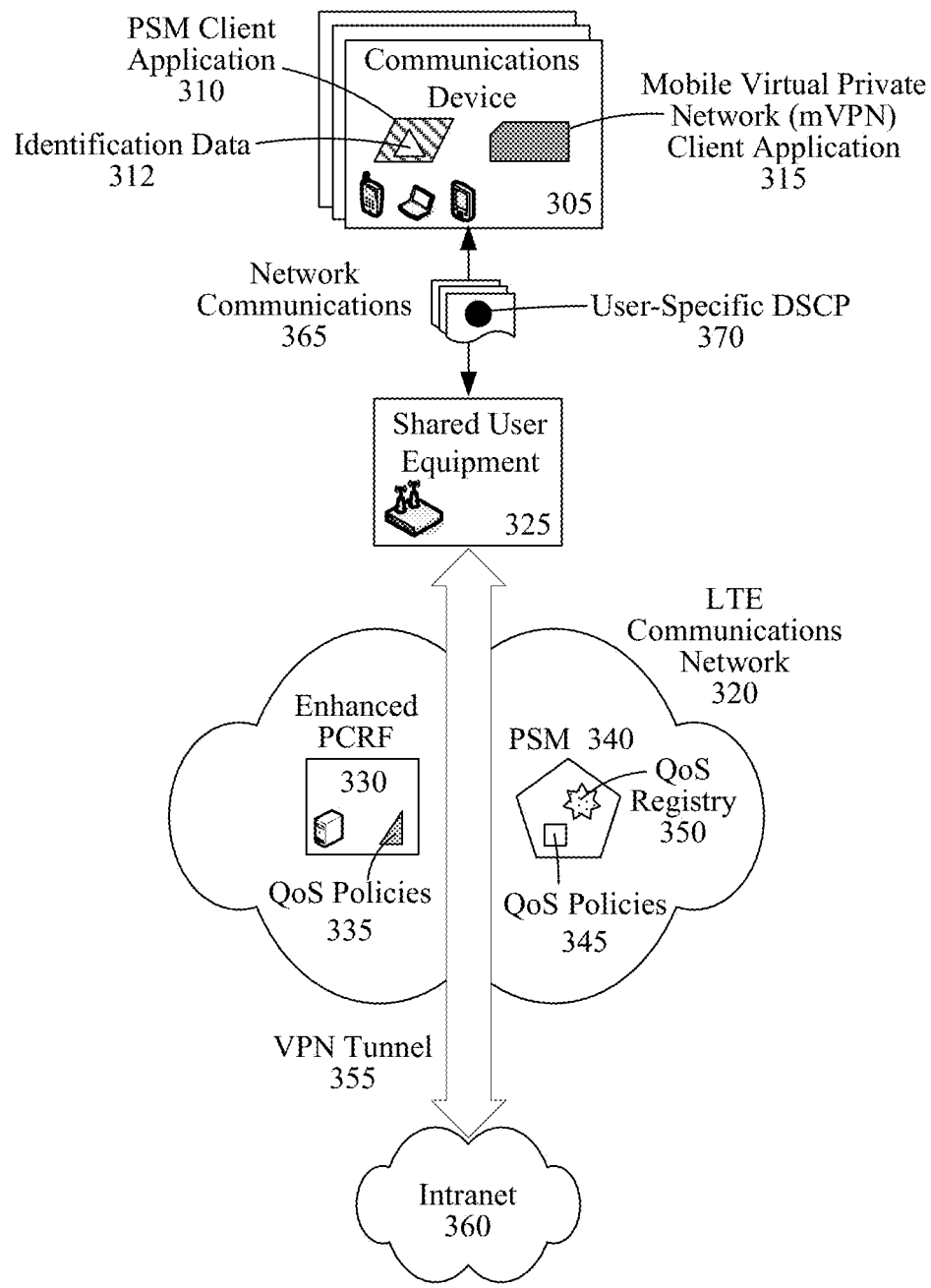
FIG. 3 depicts a schematic diagram of a system that uses an enhanced PCRF and PSM to provide user-differentiated QoS in a LTE communications network for communications devices using a shared user equipment in accordance with embodiments of the inventive arrangements disclosed herein.

FIG. 3 depicts a schematic diagram of a system 300 that uses an enhanced PCRF 330 and PSM 340 to provide user-differentiated QoS in a LTE communications network 320 for communications devices 305 using shared user equipment 325 in accordance with embodiments of the inventive arrangements disclosed herein. System 300 can represent a specific embodiment of system 200 of FIG. 2.

In system 300, communications devices 305 can connect to a LTE communications network 320 via the shared user equipment 325 to exchange network communications 365 with an Intranet 360 using a mobile virtual private network (mVPN). The LTE communications network 320 can handle the network communications 365 with a quality of service (QoS) specific to a user of the communications device 305 instead of the QoS of the shared user equipment 325, as is done in conventional LTE communications networks 320.

A communications device 305, also referred to as an end-user device, can represent a variety of electronic devices that are capable of sending and receiving network communications 365 over the LTE communications network 320, including, but not limited to a two-way radio, a hand-held computing device, a portable data assistant (PDA), a cell phone, a smart phone, a laptop computer, a mobile data terminal (MDT), and the like.

The communications device 305 can support operation of a PSM client application 310 and a mobile virtual private network (mVPN) client application 315. As it is known in the art, the mVPN client application 315 can be a software program used to encapsulate network communications 365 for conveyance over the LTE communications network 320 to an intranet 360 using a VPN tunnel 355.

The PSM client application 310 can be a software program configured to perform operations on the communications device 305 that assist the policy services manager (PSM) 340 to preserve the QoS of the network communications 365 originating from a user/communications device 305 when passing through the shared user equipment 325. The PSM client application 310 can include identification data 312 that can be used to uniquely identify the user/communications device 305.

The shared user equipment 325 can represent a user equipment node of the LTE communications network 320 that is capable of supporting the exchange of network communications 365 for multiple communications devices 305. That is, the shared user equipment 325 can act as an intermediary node by which the communications devices 305 are able to access the LTE communications network 320. Communications devices 305 can connect to the shared user equipment 325 using wireless and/or wireline technologies.

For example, the shared user equipment 325 can correspond to a vehicular subscriber module (VSM) commonly used in public safety vehicles to provide officers with a mobile data terminal (MDT) or laptop by which to access data and/or software applications residing in the public safety Intranet 360. In another example, the shared user equipment 325 can be a mobile virtual private network (mVPN) device that directly connects to a communications device 305 to register with the LTE communications network 320 and then provides connectivity for other end-users.

Additionally, the shared user equipment 325 can represent a communications device 305 having a hardware and/or software configuration that allows the communications device 305 to act as a mobile access point for the LTE communications network 320. For example, many smart phones 305 can be configured to act as a mobile access point to their underlying service provider 320.

Since the configuration and functionality of LTE communications network 320 are well known in the art, only those components and associated details as relevant to the present invention shall be included herein.

In order to provide the user-differentiated QoS to the network communications 365, the LTE communications network 320 of system 300 can include an enhanced PCRF 330 and a policy services manager (PSM) 340. The enhanced PCRF 330 and PSM 340 can represent additional functionality, which is not available in the conventional LTE communications network 320.

The PSM 340 in conjunction with its client application 310 operating upon the communications device 305 can preserve the QoS of service requests (not shown) and subsequent network communications 365 through the VPN tunnel 355 provided by the LTE communications network 320. The PSM 340 can include a set of QoS policies 345 and a QoS registry 350.

The QoS policies 345 can define the handling of service requests/network communications 365 for combinations of conditional parameters. These conditional parameters can be related to the communications device 305, a user of the communications device 305, and/or organizational policies. The PSM 340 can use the QoS policies 345 to determine the QoS that should be appropriated for a specific service bearer and/or service data flow (SDF).

The QoS registry 350 can be a data structure used to store associations that relate a communications device 305, the shared user equipment 325 it uses, a specific user of the communications device 305, and the like. The QoS registry 350 can capture this data during a registration process for its client application 310.

The enhanced PCRF 330 can be a PCRF that has been configured to additionally provide functionality required by interactions with the PSM 340. The enhanced PCRF 330 can enforce the appropriation of a service bearer within the LTE communications network 320 that is commensurate with the QoS determined by the PSM 340. Additionally, the enhanced PCRF 330 can generate a user-specific differentiated services code point (DSCP) 370 to correlate the network communications 365 with the appropriate service bearer.

The PSM client application 310 can then use the user-specific DSCP 370 identifying information within the header of the network communications 365. The LTE communications network 320 can then use the user-specific DSCP 370 to match the network communications 365 to the appropriate service bearer.

It should be emphasized that the user-specific DSCP 370 utilized in system 300 can be in addition to any other DSCPs used within the LTE communications network 320 for QoS purposes. That is, the user-specific DSCP 370 of system 300 can be used specifically for bearer mapping purposes; the user-specific DSCP 370 can be used without standard connotations of an implied QoS.

Figure 4:
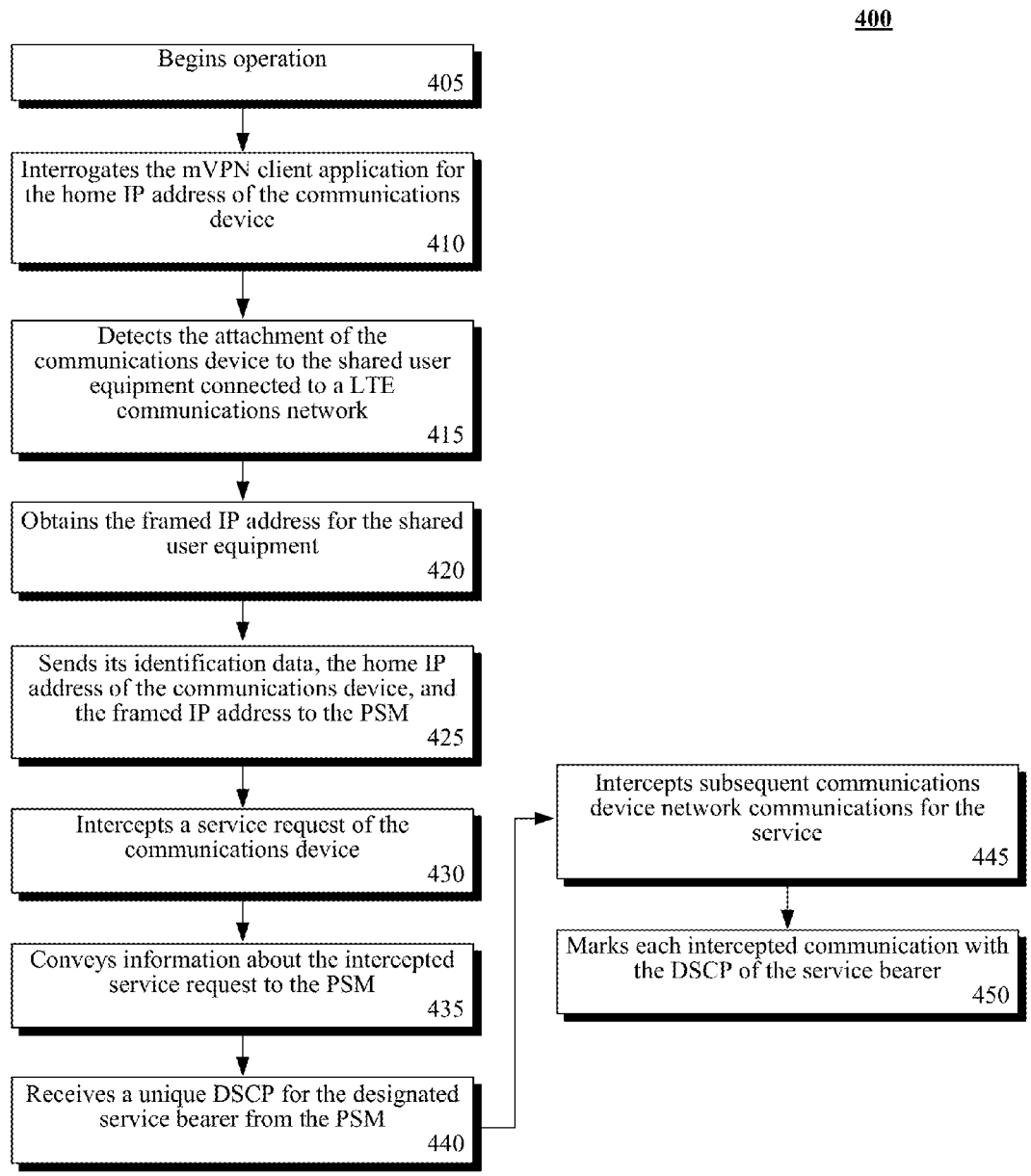
FIG. 4 is a flowchart of a method detailing actions performed by a priority services manager (PSM) client application to preserve the QoS of service requests and subsequent network communications in accordance with embodiments of the inventive arrangements disclosed herein.

FIG. 4 is a flowchart of a method 400 detailing actions performed by the PSM client application to preserve the QoS of service requests and subsequent network communications in accordance with embodiments of the inventive arrangements disclosed herein. Method 400 can be performed within the context of system 300 and/or system 200.

Method 400 can begin in step 405 where the PSM client application can begin operation upon the communications device. The mVPN client application can be interrogated for the home IP address of the communications device in step 410.

In step 415, the attachment of the communications device to the shared user equipment connected to the LTE communications network can be detected. The framed IP address assigned to the shared user equipment by the LTE communications network can be obtained in step 420. In step 425, the identification data of the PSM client application, the home IP address of the communications device, and the obtained framed IP address of the shared user equipment can be sent to the PSM.

A service request generated by the communications device can be intercepted in step 430. In step 435, information about the intercepted service request can be sent to the PSM. In response, a unique differentiated services code point (DSCP) corresponding to the service bearer handling the requested service can be received from the PSM in step 440.

In step 445, subsequent network communications generated by the communications device for the service can be intercepted. Each intercepted communication can then be marked with the DSCP of the service bearer in step 450 to ensure that the shared user equipment and LTE communications network route the network communication to the identified service bearer.

Figure 5:
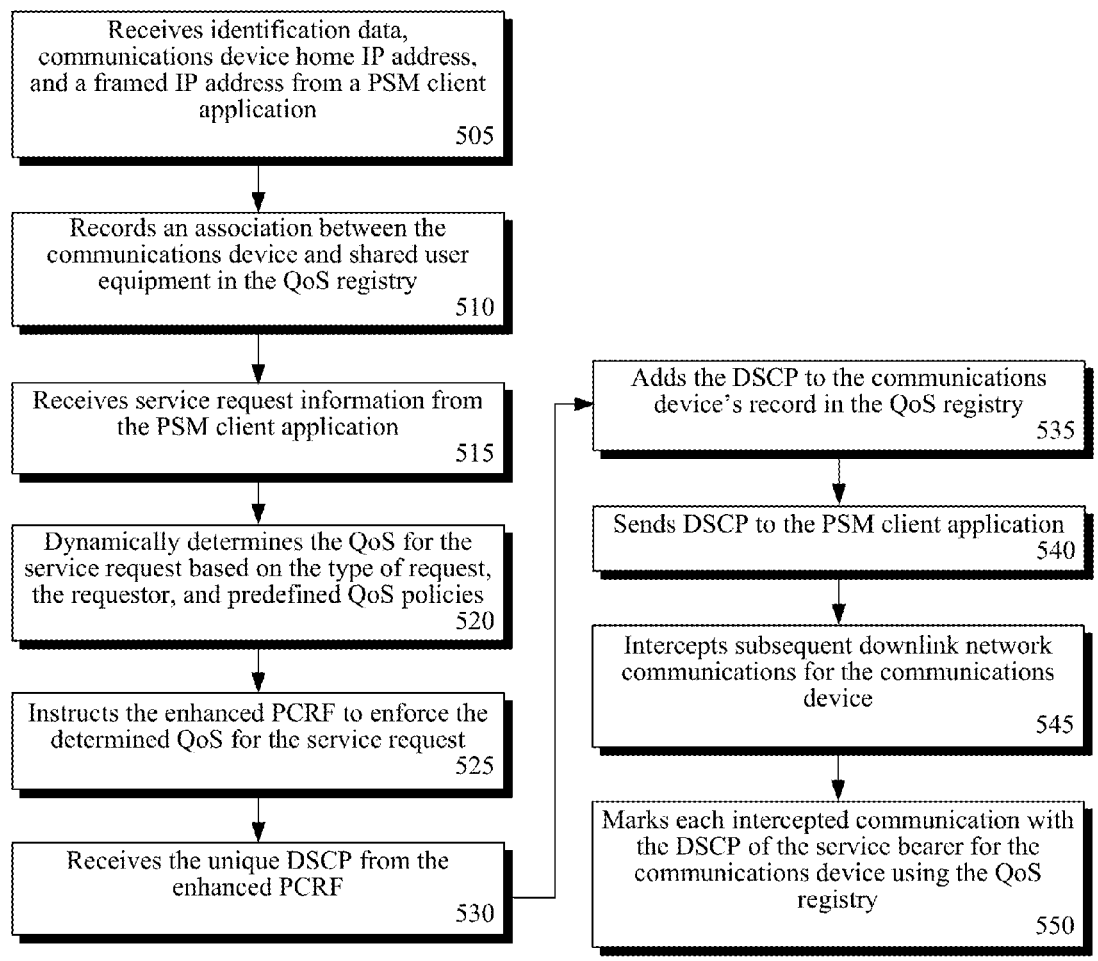
FIG. 5 is a flowchart of a method describing actions performed by the PSM to preserve the QoS of service requests and subsequent network communications in accordance with embodiments of the inventive arrangements disclosed herein.

FIG. 5 is a flowchart of a method 500 describing actions performed by the PSM to preserve the QoS of service requests and subsequent network communications in accordance with embodiments of the inventive arrangements disclosed herein. Method 500 can be performed within the context of systems 200 and 300 and/or in conjunction with method 400.

Method 500 can begin in step 505 where the PSM can receive identification data, the communications device's home IP address, and the framed IP address of the shared user equipment being used from a PSM client application. An association between the communications device and the shared user equipment can be recorded in the QoS registry in step 510.

In step 515, information about a service request can be received from the PSM client application. The QoS for the received service request can be dynamically determined based upon the type of request, the requestor, and predefined QoS policies in step 520.

In step 525, the PSM can instruct the enhanced PCRF to enforce the determined QoS for the service request. In response, the PSM can receive the unique DSCP from the enhanced PCRF in step 530. The received DSCP can be added to the communications device's record in the QoS registry in step 535 and sent to the PSM client application in step 540.

In step 545, subsequent downlink network communications for the communications device can be intercepted. Each intercepted communication can then be marked with the appropriate DSCP of the service bearer for the communications device using the data previously recorded in the QoS registry in step 550.

Figure 6:
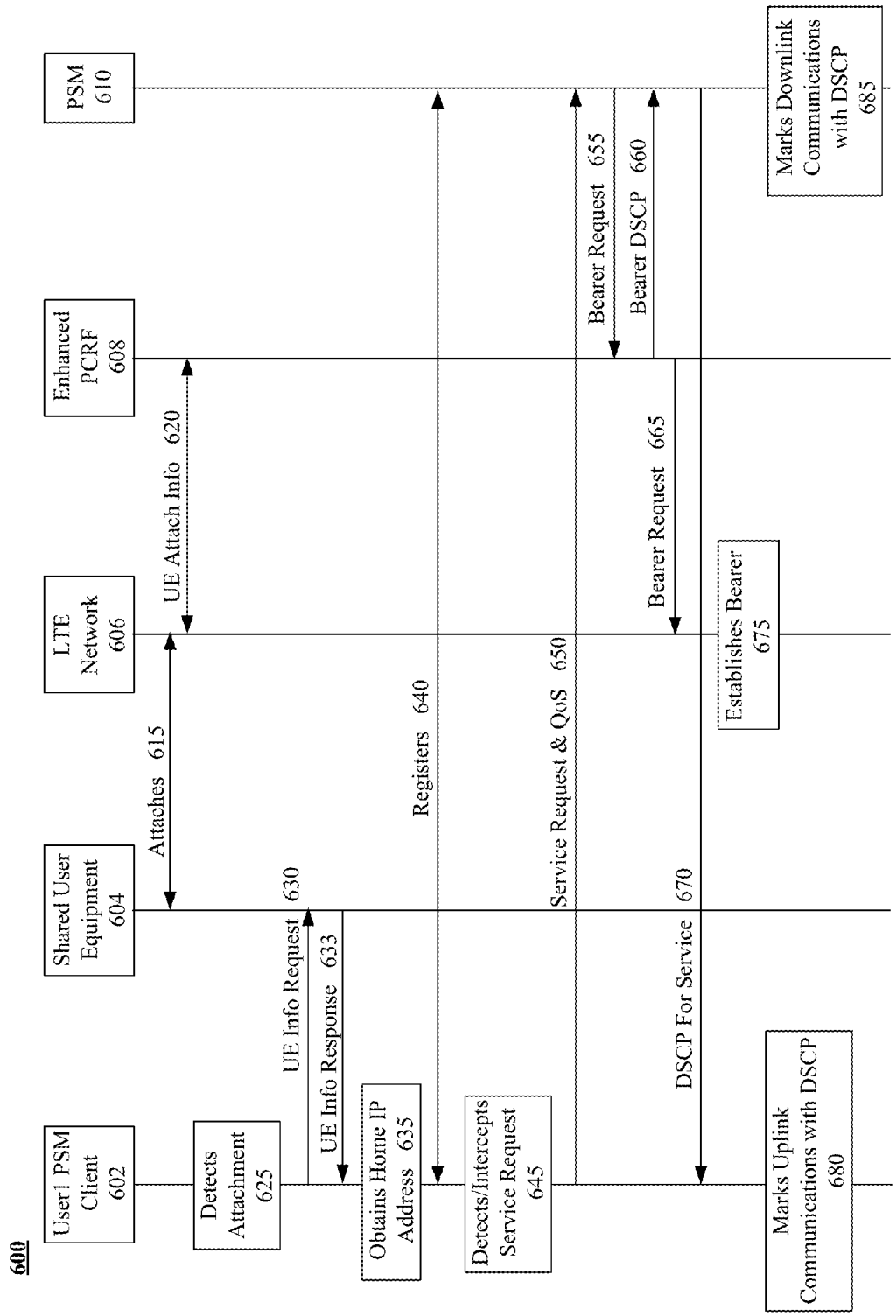
FIG. 6 shows an interaction diagram depicting the communication between system components to provide user-differentiated QoS for a shared connection point in accordance with embodiments of the inventive arrangements disclosed herein.

FIG. 6 shows an interaction diagram 600 depicting the communication between system components 602-610 to provide user-differentiated QoS for a shared connection point in accordance with embodiments of the inventive arrangements disclosed herein. The exchanges of interaction diagram 600 can occur within the context of systems 200 and 300 and/or methods 400 and 500.

Interaction diagram 600 can begin with the shared user equipment 604 attaching 615 to the LTE network 606. Information about the attachment of the shared user equipment 604 can be provided 620 to the enhanced PCRF 608 by the LTE network 606.

The PSM client application 602 can then detect 625 the attachment of the shared user equipment 604 to the LTE network 606. This detection 625 can trigger the PSM client application 602 of a user (User 1, in this example) to request 630 information from the shared user equipment 604. The shared user equipment 604 can send 633 the PSM client application 602 a response that can include the framed IP address assigned to the shared user equipment 604 by the LTE network 606.

Upon receipt of the shared user equipment's 604 response 637, the PSM client application 602 can obtain 635 the home IP address for the communications device from which it is running. As described in step 410 of method 400, the home IP address can be requested from the mVPN client application that is also running on the communications device.

It should be noted that the obtainment 635 of the home IP address by the PSM client application 602 can be performed independently of and/or in parallel with the attachment 615 of the shared user equipment 604 to the LTE network 606. As such, the series of interactions 615-625 shown in interaction diagram 600 can illustrate the scenario where the communications device, and, therefore, the PSM client application 602, is activated by User1 after the initiation of the shared user equipment 604. In the scenario where the shared user equipment 604 attaches 615 to the LTE network 606 after the activation of the PSM client application 602 (i.e., User1 powers on the communications device before the shared user equipment 604), the obtainment 635 of the home IP address can occur at the same time as or after the attachment 615 of the shared user equipment 604.

The PSM client application 602 can then register 640 with the PSM 610. For registration 640, the PSM client application 602 can provide the PSM 610 with identification data for User1, the home IP address of the communications device, and the framed IP address of the shared user equipment 604, as detailed in step 510 of method 500.

The PSM client application 602 can then detect and intercept 645 a service request generated by User1's use of the communications device. The PSM client application 602 can send 650 the service request and its QoS to the PSM 610. The PSM 610 can request 655 a service bearer from the enhanced PCRF 608 for the service request and QoS. This request can include the QoS parameter specific to User1 that was received from the PSM client application 602.

The enhanced PCRF 608 can provide 660 the DSCP of the service bearer to the PSM 610. A service bearer can then be requested 665 by the enhanced PCRF 608 to be established by the LTE network 606 having the QoS parameter and the DSCP.

The PSM 610 can send 670 the PSM client application 602 the DSCP that is to be used for the service. The LTE network 606 can perform actions to establish 675 the requested service bearer. The PSM client application 602 can mark 680 uplink communications with the received DSCP and the PSM 610 can mark 685 downlink communications for the PSM client 602 with the received DSCP.

It is important to note that these interactions can be performed independently and/or in parallel for each PSM client application 602 using the shared user equipment 604 for communication services.

In terms of a public safety environment, the interactions shown in diagram 600 can allow the communications of each public safety officer that is connected to the shared user equipment 604, which could also be supporting non-public safety users, to be handles with a QoS that is commensurate with their need and/or urgency. This can be particularly important since the LTE network 606 can be a commercial system that supports a large volume of users and a wide variety of services with a limited set of resources.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing user-differentiated quality of service to an end-user accessing a wireless communication network, the method comprising:
    registering an end-user device with a priority services manager of a wireless communication network, wherein the end-user device is provided access to the mobile communication network through an intermediary node, wherein the intermediary node is a shared user equipment that acts as a shared connection point for a plurality of end-user devices including the end-user device and wherein said registration provides the priority services manager with a plurality of identification data for the end-user device and intermediary node;
    when at least one communication flow to the end-user device is required, dynamically determining a quality of service attribute for the at least one communication flow in accordance with a plurality of predefined quality of service policies and wherein the determined quality of service attribute is specific to the end-user device;
    requesting establishment of the at least one communication flow having the dynamically-determined quality of service attribute to the intermediary node from the wireless communication network, wherein the mobile communication network provides a unique mapping identifier for each established communication flow; and
    communicating data messages labeled with the unique mapping identifier for the established at least one communication flow with the end-user device via the wireless communication network, wherein each data message is handled with the determined quality of service attribute.

2. The method of claim 1, wherein the intermediary node is a second end-user device having been configured to act as a mobile access point for communicating with the wireless communication network.

3. The method of claim 1, wherein the wireless communication network lacks a capability to differentiate quality of service attributes between different end-user devices that connect to the wireless communication network via the intermediary node.

4. The method of claim 1, further comprising:
    detecting of a generation of a service request by a client application associated with the priority services manager operating on the end-user device;
    intercepting of a transmission of the service request by the client application; and
    conveying of the intercepted service request to the priority services manager, wherein the client application circumvents a conventional method of the wireless communication network for handling service requests, wherein the quality of service attribute for at least one of the end-user device and a human agent operating the end-user device is preserved by circumventing the conventional service request handling method, wherein usage of the quality of service associated with the intermediary node is avoided.

5. The method of claim 4, further comprising:
    receiving of the unique mapping identifier for each established communication flow supporting the service request from the priority services manager by the client application;
    intercepting each subsequent data message generated by the end-user device related to the service request;
    labeling each intercepted data message with the unique mapping identifier associated with its communication flow; and
    conveying each labeled data message to the intermediary node.

6. The method of claim 1, wherein requesting establishment of the at least one communication flow further comprises:
    receiving of the unique mapping identifier for each established communication flow from the wireless communication network by the priority services manager;
    recording the unique mapping identifier for each established communication flow with registration data of the end-user device; and
    conveying the unique mapping identifier for each established communication flow to a client application associated with the priority services manager operating on the end-user device.

7. The method of claim 1, wherein the steps of claim 1 are performed for a plurality of end-user devices that utilize the intermediary node for access to the wireless communication network.

8. The method of claim 1, wherein the at least one communication flow utilizes a mobile virtual private network communication pathway.

9. The method of claim 1, wherein the unique mapping identifier is a differentiated services code point (DSCP).

10. A computer program product providing user-differentiated quality of service to an end-user accessing a wireless communication network, the computer program product comprising:
    one or more computer-readable, tangible storage devices;
    program instructions, stored on at least one of the one or more storage devices, to register an end-user device with a priority services manager of a wireless communication network, wherein the end-user device is provided access to the wireless communication network through an intermediary node, wherein the intermediary node is a shared user equipment that acts as a shared connection point for a plurality of end-user devices including the end-user device and wherein said registration provides the priority services manager with a plurality of identification data for the end-user device and intermediary node;

program instructions, stored on at least one of the one or more storage devices, to, when at least one communication flow to the end-user device is required, dynamically determine a quality of service attribute for the at least one communication flow in accordance with a plurality of predefined quality of service policies and wherein the determined quality of service attribute is specific to the end-user device;

program instructions, stored on at least one of the one or more storage devices, to, request establishment of the at least one communication flow having the dynamically-determined quality of service attribute to the intermediary node from the mobile communication network, wherein the wireless communication network provides a unique mapping identifier for each established communication flow; and program instructions, stored on at least one of the one or more storage devices, to communicate data messages labeled with the unique mapping identifier for the established at least one communication flow with the end-user device via the wireless communication network, wherein each data message is handled with the determined quality of service attribute.

11. The computer program product of claim 10, further comprising:

program instructions, stored on at least one of the one or more storage devices, to detect a generation of a service request by a client application associated with the priority services manager operating on the end-user device;

program instructions, stored on at least one of the one or more storage devices, to intercept transmission of the detected service request; and program instructions, stored on at least one of the one or more storage devices, to convey the intercepted service request to the priority services manager, wherein the client application circumvents a conventional method of the wireless communication network for handling service requests, wherein the quality of service attribute for at least one of the end-user device and a human agent operating the end-user device is preserved by circumventing the conventional service request handling method, wherein usage of the quality of service associated with the intermediary node is avoided.

12. The computer program product of claim 11, further comprising:

program instructions, stored on at least one of the one or more storage devices, to receive the unique mapping identifier for each established communication flow supporting the service request from the priority services manager;

program instructions, stored on at least one of the one or more storage devices, to intercept each subsequent data message generated by the end-user device related to the service request;

program instructions, stored on at least one of the one or more storage devices, to label each intercepted data message with the unique mapping identifier associated with its communication flow; and program instructions, stored on at least one of the one or more storage devices, to convey each labeled data message to the intermediary node.

13. A mobile communication device capable of providing user-differentiated quality of service to an end-user accessing a wireless communications network via the mobile communication device, the mobile communication device comprising:

one or more processors, one or more computer-readable memories and one or more computer-readable, tangible storage devices;

a mobile communication network transceiver for receiving and conveying information over a mobile telephony network using a plurality of bearers, each terminating at the wireless communication network based on a unique identifier of the mobile communication device;

a local area network transceiver for receiving and conveying information between the mobile communication device and a set of two or more proximate end-user devices, wherein the mobile communication device is a shared user equipment that acts as a shared connection point for the set of two or more proximate end-user devices; and program instructions, stored on at least one of the one or more storage devices for execution by at least one of the one or more processors via at least one of the one or more memories, to function as a communication intermediary permitting the two or more proximate end-user devices connected via the local area network transceiver to communicate with a remote computing network via the wireless communication network at a quality of service level specific to one of the two or more proximate end-user devices.

14. The mobile communication device of claim 13, wherein the mobile communication device is a user equipment component of the wireless communication network.

15. The mobile communication device of claim 13, wherein the wireless communication network is a Long Term Evolution (LTE) network.

16. The mobile communication device of claim 13, wherein the local area network transceiver is at least one of a BLUETOOTH transceiver, an Ethernet cable, and a wireless network transceiver.

17. The mobile communication device of claim 13, wherein each bearer is a mobile virtual private network communication pathway.

18. The mobile communication device of claim 13, wherein the wireless communication network lacks a capability to differentiate quality of service attributes between different end-user devices that connect to the wireless communication network via the communication intermediary functionality of the mobile communication device, wherein the wireless communication network distinguishes endpoints of bearers using device-unique identifiers, which includes a unique identifier for the mobile communication device.

19. The mobile communication device of claim 13, wherein the communication intermediary function of the mobile communication device establishes different communication flows between the two or more proximate devices and the remote computing network, wherein each of the different communication flows has flow-specific quality of service attributes distinct for that flow, wherein each of the bearers is a flow-specific bearer between the mobile communication device and the remote computing network, wherein each flow-specific bearer has quality of service attributes that correspond to the flow-specific quality of service attributes of the flow to which the flow-specific bearer corresponds.

* * * * *

UNITED STATES PATENT AND TRADEMARK OFFICE
CERTIFICATE OF CORRECTION

PATENT NO. : 8,861,438 B2  Page 1 of 1
APPLICATION NO. : 13/296971
DATED : October 14, 2014
INVENTOR(S) : Rummana S. Sadiq et al.

It is certified that error appears in the above-identified patent and that said Letters Patent is hereby corrected as shown below:

IN THE TITLE PAGE:

On Page 2, Item (56), under "OTHER PUBLICATIONS", in Column 2, Line 12, delete "33GPP" and insert -- 3GPP --, therefor.

IN THE SPECIFICATION:

In Column 4, Line 8, delete "PCM 240" and insert -- PSM 240 --, therefor.

Signed and Sealed this
Thirty-first Day of May, 2016

Michelle K. Lee
*Director of the United States Patent and Trademark Office*